US012112655B2

(12) United States Patent
Ferguson et al.

(10) Patent No.: US 12,112,655 B2
(45) Date of Patent: Oct. 8, 2024

(54) SYSTEMS AND METHODS FOR ONE-CLICK DELIVERY OF AUTONOMOUS VEHICLE

(71) Applicant: Nuro, Inc., Mountain View, CA (US)

(72) Inventors: David Ferguson, San Francisco, CA (US); Jiajun Zhu, Palo Alto, CA (US); Pichayut Jirapinyo, San Francisco, CA (US); Nan Ransohoff, San Francisco, CA (US)

(73) Assignee: NURO, INC., Mountain View, CA (US)

( * ) Notice: Subject to any disclaimer, the term of this patent is extended or adjusted under 35 U.S.C. 154(b) by 167 days.

(21) Appl. No.: 17/676,563

(22) Filed: Feb. 21, 2022

(65) Prior Publication Data

US 2022/0180419 A1   Jun. 9, 2022

Related U.S. Application Data

(63) Continuation of application No. 16/158,917, filed on Oct. 12, 2018, now abandoned, which is a
(Continued)

(51) Int. Cl.
*G06Q 50/40* (2024.01)
*B60P 3/00* (2006.01)
(Continued)

(52) U.S. Cl.
CPC ............ *G09F 21/048* (2013.01); *B60P 3/007* (2013.01); *B60R 19/483* (2013.01); *B60R 21/34* (2013.01);
(Continued)

(58) Field of Classification Search
CPC ............ G05D 2201/0213; G06Q 50/30; G06Q 30/0641; G06Q 10/0838; G06Q 10/0837;
(Continued)

(56) References Cited

U.S. PATENT DOCUMENTS 10,538,190 B1 *   1/2020   Metellus .................... B60F 5/02
11,200,532 B2 *  12/2021   Peterson ............ G07C 9/00896
(Continued)

FOREIGN PATENT DOCUMENTS

WO   WO-2016164577 A1 *  10/2016   ......... G06Q 10/0832

OTHER PUBLICATIONS

Richards, Janelle, "Robots Could Change the Face of Food Delivery", Mar. 10, 2017, nbcnews.com, 6 pages (Year: 2017).*
(Continued)

*Primary Examiner* — Shannon S Campbell
*Assistant Examiner* — Freda A Nelson

(57) ABSTRACT

A delivery system includes a database configured to store information of a customer where the information includes a default payment method, a communication system configured to communicate with an autonomous vehicle and with a device of the customer, where the device includes a display screen having a button to summon an autonomous vehicle, at least one processor, and a memory storing instructions. The instructions, when executed by the at least one processor, cause the delivery system to receive an indication via the communication system that the button on the device of the customer has been clicked, and instruct the autonomous vehicle to travel to a location of the customer.

13 Claims, 5 Drawing Sheets

Related U.S. Application Data continuation-in-part of application No. PCT/US2018/044361, filed on Jul. 30, 2018.

(60) Provisional application No. 62/538,538, filed on Jul. 28, 2017.

(51) Int. Cl.

| | | |
|---|---|---|
| *B60R 19/48* | (2006.01) | |
| *B60R 21/34* | (2011.01) | |
| *B60W 30/08* | (2012.01) | |
| *B60W 60/00* | (2020.01) | |
| *B65G 67/24* | (2006.01) | |
| *G01C 21/20* | (2006.01) | |
| *G01C 21/34* | (2006.01) | |
| *G05D 1/00* | (2006.01) | |
| *G06F 16/955* | (2019.01) | |
| *G06K 7/10* | (2006.01) | |
| *G06K 7/14* | (2006.01) | |
| *G06K 19/06* | (2006.01) | |
| *G06K 19/07* | (2006.01) | |
| *G06N 20/00* | (2019.01) | |
| *G06Q 10/0631* | (2023.01) | |
| *G06Q 10/0635* | (2023.01) | |
| *G06Q 10/08* | (2023.01) | |
| *G06Q 10/083* | (2023.01) | |
| *G06Q 10/0832* | (2023.01) | |
| *G06Q 10/0833* | (2023.01) | |
| *G06Q 10/0834* | (2023.01) | |
| *G06Q 10/0835* | (2023.01) | |
| *G06Q 10/0837* | (2023.01) | |
| *G06Q 20/00* | (2012.01) | |
| *G06Q 20/12* | (2012.01) | |
| *G06Q 20/18* | (2012.01) | |
| *G06Q 30/0251* | (2023.01) | |
| *G06Q 30/0601* | (2023.01) | |
| *G06Q 30/0645* | (2023.01) | |
| *G06Q 50/12* | (2012.01) | |
| *G06V 20/64* | (2022.01) | |
| *G07F 17/00* | (2006.01) | |
| *G07F 17/12* | (2006.01) | |
| *G08G 1/00* | (2006.01) | |
| *G08G 1/04* | (2006.01) | |
| *G09F 21/04* | (2006.01) | |
| *H04L 67/12* | (2022.01) | |
| *H04W 4/024* | (2018.01) | |
| *H04W 4/40* | (2018.01) | |
| *A23L 2/52* | (2006.01) | |
| *A23L 5/00* | (2016.01) | |
| *A23L 7/109* | (2016.01) | |
| *A47J 37/06* | (2006.01) | |
| *A47J 47/00* | (2006.01) | |
| *B60H 1/00* | (2006.01) | |
| *B60P 1/36* | (2006.01) | |
| *B60P 3/025* | (2006.01) | |
| *B60R 19/18* | (2006.01) | |
| *B60R 21/36* | (2011.01) | |
| *B60R 25/25* | (2013.01) | |
| *G06F 3/0484* | (2022.01) | |
| *G06V 20/56* | (2022.01) | |
| *H04N 5/76* | (2006.01) | |
| *H05B 6/68* | (2006.01) | |

(52) U.S. Cl.
CPC .......... *B60W 30/08* (2013.01); *B60W 60/001* (2020.02); *B60W 60/0017* (2020.02); *B60W 60/00256* (2020.02); *B65G 67/24* (2013.01); *G01C 21/20* (2013.01); *G01C 21/343* (2013.01); *G01C 21/3438* (2013.01); *G01C 21/3453* (2013.01); *G05D 1/0027* (2013.01); *G05D 1/0033* (2013.01); *G05D 1/0038* (2013.01); *G05D 1/0088* (2013.01); *G05D 1/0094* (2013.01); *G05D 1/0212* (2013.01); *G05D 1/0231* (2013.01); *G05D 1/0276* (2013.01); *G05D 1/0291* (2013.01); *G05D 1/12* (2013.01); *G06F 16/955* (2019.01); *G06K 7/10297* (2013.01); *G06K 7/1413* (2013.01); *G06K 19/06028* (2013.01); *G06K 19/0723* (2013.01); *G06N 20/00* (2019.01); *G06Q 10/0631* (2013.01); *G06Q 10/06315* (2013.01); *G06Q 10/0635* (2013.01); *G06Q 10/08* (2013.01); *G06Q 10/083* (2013.01); *G06Q 10/0832* (2013.01); *G06Q 10/0833* (2013.01); *G06Q 10/0834* (2013.01); *G06Q 10/0835* (2013.01); *G06Q 10/08355* (2013.01); *G06Q 10/0837* (2013.01); *G06Q 20/00* (2013.01); *G06Q 20/127* (2013.01); *G06Q 20/18* (2013.01); *G06Q 30/0265* (2013.01); *G06Q 30/0266* (2013.01); *G06Q 30/0631* (2013.01); *G06Q 30/0645* (2013.01); *G06Q 50/12* (2013.01); *G06Q 50/40* (2024.01); *G06V 20/64* (2022.01); *G07F 17/0057* (2013.01); *G07F 17/12* (2013.01); *G08G 1/04* (2013.01); *G08G 1/202* (2013.01); *H04L 67/12* (2013.01); *H04W 4/024* (2018.02); *H04W 4/40* (2018.02); *A23L 2/52* (2013.01); *A23L 5/00* (2016.08); *A23L 7/109* (2016.08); *A23V 2002/00* (2013.01); *A47J 37/0658* (2013.01); *A47J 47/00* (2013.01); *B60H 1/00364* (2013.01); *B60H 1/00735* (2013.01); *B60P 1/36* (2013.01); *B60P 3/0257* (2013.01); *B60R 19/18* (2013.01); *B60R 2021/346* (2013.01); *B60R 21/36* (2013.01); *B60R 25/25* (2013.01); *B60R 25/252* (2013.01); *B60W 2420/403* (2013.01); *B60W 2420/408* (2024.01); *B65G 2209/06* (2013.01); *G06F 3/0484* (2013.01); *G06K 7/10722* (2013.01); *G06V 20/56* (2022.01); *G08G 1/22* (2013.01); *H04N 5/76* (2013.01); *H05B 6/688* (2013.01)

(58) Field of Classification Search
CPC .. G06Q 10/0835; G07F 17/0057; G08G 1/202
USPC .............. 705/333, 336, 341; 701/3
See application file for complete search history.

(56) References Cited

U.S. PATENT DOCUMENTS

| | | |
|---|---|---|
| 2010/0084426 A1 | 4/2010 | Devers et al. |
| 2013/0210462 A1 | 8/2013 | Busch |
| 2014/0081445 A1 | 3/2014 | Villamar |
| 2014/0282931 A1* | 9/2014 | Protopapas ......... B60R 25/2081 726/5 |
| 2015/0006005 A1 | 1/2015 | Yu et al. |
| 2015/0019873 A1* | 1/2015 | Hagemann .............. B60R 25/25 713/186 |
| 2015/0120094 A1* | 4/2015 | Kimchi ................ G08G 5/0069 701/3 |
| 2015/0356501 A1* | 12/2015 | Gorjestani ......... G06Q 10/0833 705/333 |
| 2015/0379796 A1* | 12/2015 | Glasgow ............ G07C 9/00571 340/5.51 |
| 2017/0091856 A1 | 3/2017 | Canberk et al. |
| 2017/0123421 A1* | 5/2017 | Kentley .............. G05D 1/0088 |
| 2017/0124511 A1 | 5/2017 | Mueller et al. |

(56) References Cited

U.S. PATENT DOCUMENTS

| | | | |
|---|---|---|---|
| 2017/0174343 A1 | 6/2017 | Erickson et al. | |
| 2017/0228692 A1 | 8/2017 | Pargoe | |
| 2018/0053139 A1* | 2/2018 | Stoman | G06Q 10/083 |
| 2018/0121961 A1 | 5/2018 | Villanueva | |
| 2018/0144302 A1 | 5/2018 | Murray et al. | |
| 2018/0260778 A1 | 9/2018 | Mazetti et al. | |
| 2018/0357907 A1* | 12/2018 | Reiley | G08G 1/005 |
| 2019/0204992 A1* | 7/2019 | Bowden | G01C 21/343 |

OTHER PUBLICATIONS

Harris, Mark, "Our streets are made for people: San Francisco mulls ban on delivery robots", Wed May 31, 2017, the guardian.com, 5 pages (Year: 2017).*

Galarza, Daniela, "San Francisco Declares War on Food Delivery Robots", May 17, 2017, eater.com, 3 pages (Year: 2017).*

International Search Report and Written Opinion issued by the International Searching Authority on Oct. 10, 2018 in International Application No. PCT/US2018/044361, 12 pages.

David Wyld, "Why Amazon's 'Up in the Air' Idea is Important for All of Us." publicspendforum.net, Jan. 1, 2017, 7 pages.

Parmy Olsen, "Self-Driving Robots Will Start Delivering Food For Just Eat and Others," Forbes.com, Jul. 5, 2015, 5 pages.

"Technological Disruption and Innovation in Last Mile Delivery," OIG USPS; RARC Report: Report No. RARC-WP-16-012, Jun. 6, 2016, 30 pages.

* cited by examiner

SYSTEMS AND METHODS FOR ONE-CLICK DELIVERY OF AUTONOMOUS VEHICLE

CROSS-REFERENCE TO RELATED APPLICATIONS

The present application is a continuation of U.S. application Ser. No. 16/158,917, filed on Oct. 12, 2018, which is a continuation-in-part of International Application No. PCT/US2018/044361, filed on Jul. 30, 2018, which claims the benefit of U.S. Provisional Application No. 62/538,538, filed on Jul. 28, 2017. The entire contents of each of the foregoing applications are hereby incorporated by reference.

FIELD OF THE TECHNOLOGY

The present application relates to systems and method for one-click delivery of an autonomous vehicle, and in particular, for delivering an autonomously vehicle to a current location of a customer.

BACKGROUND

Businesses have been focusing on making customers' burden easier and simpler in making orders. For example, customers have had to go to brick and mortar shopping places to buy what they want, but now they can go to online stores for shopping so that they can reduce, by clicking hyperlinks in websites, time for travelling and efforts for looking around physical space of the shopping place to find what they want. Further, businesses have been trying to make an easy payment process so that customers can make less clicks and less typing to order what they want to buy. For example, Amazon® has introduced the one-click payment system. With a default payment method saved in the system, customers can make a single click to place and pay for an order, and the system uses the default payment method to process a payment for the order.

However, even with these businesses' efforts, customers have to stay at a stationary place, for example a home or office, to receive or at least secure receipt of the ordered package. When customers specifically ask for just in case they are not home or office, delivery personnel may place ordered packages at a certain place (e.g., front door, back of the house, or a storage). Such delivery methods can pose a risk of losing the delivered item.

Further, when customers are not satisfied with the ordered packages or when the delivered package is not in its original condition or not what they have ordered, they have to return the delivered package back. Most of times, they have to pack the package, go to a local delivery carrier, and mail it back to the seller. Some businesses have developed an easy return method by inserting a return slip, which can be used for return. Furthermore, delivery carriers now provide a pickup service so that customers do not have to go to a local carrier. Nevertheless, customers still have to stay at a stationary place (e.g., home or office) to wait for the pickup. Thus, there are needs for improvements in easier delivery and/or return methods to lessen customers' burden.

SUMMARY

This disclosure relates to a one-click delivery of an autonomous vehicle, and in particular, to delivering an autonomously vehicle to a current location of a customer for an order.

In accordance with aspects of the present disclosure, a delivery system includes a database configured to store information of a customer where the information includes a default payment method, a communication system configured to communicate with an autonomous vehicle and with a device of the customer, where the device includes a display screen having a button to summon an autonomous vehicle, at least one processor, and a memory storing instructions. The instructions, when executed by the at least one processor, cause the delivery system to receive an indication via the communication system that the button on the device of the customer has been clicked, and instruct the autonomous vehicle to travel to a location of the customer.

In various embodiments, the location of the customer is based on a location of the device. In various embodiments, the location of the device is updated by a global positioning sensor of the device. In various embodiments, location of the customer is a default location of the customer stored in the information.

In various embodiments, the instructions, when executed by the at least one processor, cause the delivery system to update the location of the device to the autonomous vehicle when the device moves. In various embodiments, the autonomous vehicle travels to the updated location of the device.

In various embodiments, the instructions, when executed by the at least one processor, cause the delivery system to receive a payment for an order related to the button via the default payment method, when the button on the device of the customer has been clicked.

In various embodiments, the autonomous vehicle opens a compartment for the customer, when the autonomous vehicle arrives at the location of the device.

In various embodiments, the button is related to an order of a product, or a delivery order of the autonomous vehicle for an order or return of a product at the location.

In various embodiments, the autonomous vehicle is an unmanned vehicle autonomously traveling to the location of the customer.

In accordance with aspects of the present disclosure, an apparatus for summoning an autonomous vehicle includes a communication device configured to communicate with a delivery system, a display screen, at least one processor, and a memory storing instructions. The instructions, when executed by the at least one processor, cause the apparatus to communicate via the communication device information of a customer to the delivery system where the information includes a default payment method, display on the display screen a button associated with an order, communicate to the delivery system via the communication device an indication that the button has been clicked, and receive, in response to communicating the indication that the button has been clicked, an indication from the delivery system that an autonomous vehicle is to be dispatched to a location of the customer.

In various embodiments, the apparatus includes a global positioning sensor configured to update a current location of the apparatus. In various embodiments, the location of the customer is based on the global positioning sensor. In various embodiments, the location of the customer is a default location of the customer stored in the information.

In various embodiments, the instructions, when executed by the at least one processor, cause the apparatus to update the location of the customer to the delivery system when the apparatus moves. In various embodiments, the autonomous vehicle travels to the updated location of the apparatus.

In various embodiments, an order related to the button is paid via the default payment method, when the button displayed on the display screen has been clicked.

In various embodiments, the autonomous vehicle opens a compartment for the customer, when the autonomous vehicle arrives at the location of the apparatus.

In various embodiments, the button is related to an order of a product, or a delivery order of the autonomous vehicle for an order or return of a product at the location.

In various embodiments, the autonomous vehicle is an unmanned vehicle autonomously traveling to the location of the customer.

Further details and aspects of exemplary embodiments of the present disclosure are described in more detail below with reference to the appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

A better understanding of the features and advantages of the disclosed technology will be obtained by reference to the following detailed description that sets forth illustrative embodiments, in which the principles of the technology are utilized, and the accompanying drawings of which.

DETAILED DESCRIPTION

Figure 1:
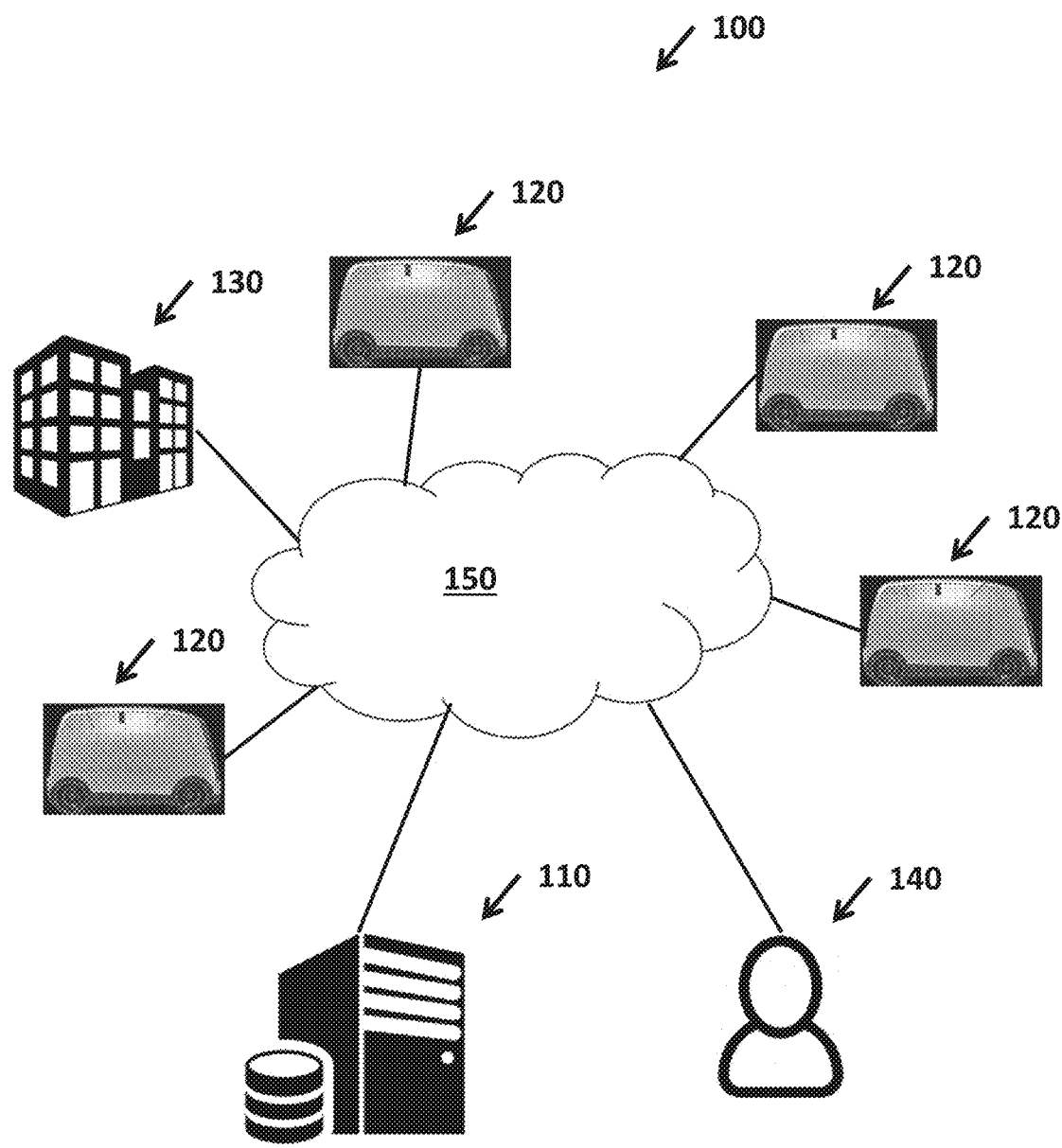
FIG. 1 is a block diagram illustrating a delivery system for a one-click delivery of an autonomous vehicle in accordance with embodiments of the present disclosure.

This disclosure relates to a one-click delivery of an autonomous vehicle and, in particular, to delivering an autonomous vehicle to a current location of a customer upon clicking a summon button displayed on the customer's smart device.

Provided herein is a delivery system delivering an autonomous vehicle to a current location of a customer upon receiving indication that the customer summons the autonomous vehicle for an order by clicking a summon button once. The delivery system directs the autonomous vehicle to the location of the customer, updates the current location when the customer has moved, and redirects the autonomous vehicle to the updated location of the customer. Thus, customers do not have to stay at the same place to receive an ordered package, to return a delivered package, or to send a package.

Definitions

As used herein, the term "autonomous" includes fully-autonomous, semi-autonomous, and any configuration in which a vehicle can operate in a controlled manner for a period without human intervention.

As used herein, the term "fleet," "sub-fleet," and like terms are used to indicate a number of land vehicles, watercraft or aircraft operating together or under the same ownership. In some embodiments, the fleet or sub-fleet is engaged in the same activity. In some embodiments, the fleet or sub-fleet are engaged in similar activities. In some embodiments, the fleet or sub-fleet are engaged in different activities.

As used herein, the term "robot," "robot vehicle," "robot fleet," "vehicle," "all-terrain vehicle," and like terms are used to indicate a mobile machine that transports autonomous vehicles or is itself an autonomous vehicle. Typical autonomous vehicles include cars, wagons, vans, motor vehicles (e.g., tricycles, trucks, trailers, buses, etc.), railed vehicles (e.g., trains, trams, etc.), watercrafts (e.g., ships, boats, ferries, landing craft, barges, rafts, etc.), aerial drones, hovercrafts (air, land and water types), aircrafts, and even including spacecrafts.

As used herein, the term "user," "operator," "fleet operator," and like terms are used to indicate the entity that owns or is responsible for managing and operating the robot fleet.

As used herein, the term "customer" and like terms are used to indicate the entity that requests services provided by the robot fleet.

As used herein, the term "server," "computer server," "central server," "main server," "mobile device," "smart device," and like terms are used to indicate a computer or device on a network that manages the fleet resources, namely the robot vehicles.

As used herein a "mesh network" is a network topology in which each node relays data for the network. All mesh nodes cooperate in the distribution of data in the network. It can be applied to both wired and wireless networks. Wireless mesh networks can be considered a type of "Wireless ad hoc" network. Thus, wireless mesh networks are closely related to Mobile ad hoc networks (MANETs). Although MANETs are not restricted to a specific mesh network topology, wireless ad hoc networks or MANETs can take any form of network topology. Mesh networks can relay messages using either a flooding technique or a routing technique. With routing, the message is propagated along a path by hopping from node to node until it reaches its destination. To ensure that all its paths are available, the network must allow for continuous connections and must reconfigure itself around broken paths, using self-healing algorithms such as Shortest Path Bridging. Self-healing allows a routing-based network to operate when a node breaks down or when a connection becomes unreliable. As a result, the network is typically quite reliable, as there is often more than one path between a source and a destination in the network. This concept can also apply to wired networks and to software interaction. A mesh network whose nodes are all connected to each other is a fully connected network.

As used herein, the term "module" and like terms are used to indicate a self-contained hardware component of the central server, which in turn includes software modules. In software, a module is a part of a program. Programs are composed of one or more independently developed modules that are not combined until the program is linked. A single module can contain one or several routines, or sections of programs that perform a particular task. As used herein the fleet management module includes software modules for managing various aspects and functions of the robot fleet.

FIG. 1 shows a delivery system 100 for delivering autonomous vehicles when receiving a summon from a customer in accordance with embodiments of the present disclosure. The delivery system 100 includes delivery server 110 and one or more autonomous vehicles 120. In an aspect, the delivery system 100 may include a parking station 130 where autonomous vehicles 120 may be securely parked or stationed. The delivery server 110, the autonomous vehicles 120, and the parking station 130 communicate with each other via a network 150, which may be a mesh network, wireless network, ad hoc network, Internet, or MANET.

When a customer 140 makes a request for summoning an autonomous vehicle, the delivery server 110 receives the summon request via the network 150. The customer 140 may make the summon request via a smart device, a computer, tablet, or compatible computing device, which can access the network and communicate with the delivery server 110.

Figure 2:
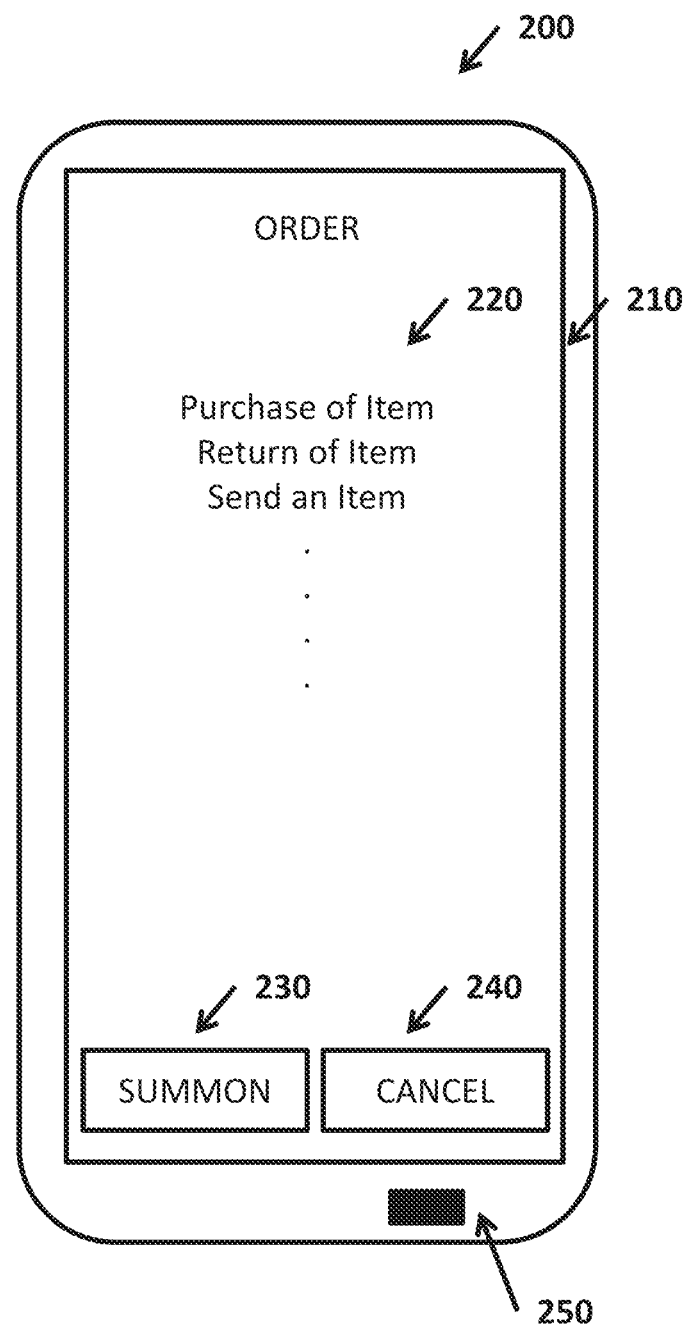
FIG. 2 is a graphical illustration of a smart device in accordance with embodiments of the present disclosure.

For example, as shown in FIG. 2, the customer 140 may use a smartphone 200 to make a summon request for an autonomous vehicle. The smartphone 200 is provided for only an example and can be other smart devices such as a laptop, desktop, tablet, phablet, personal data assistant, or other similar computing devices. The smartphone 200 has a display screen 210. In an aspect, the customer 140 may have to download and install a smartphone application for summoning an autonomous vehicle. In an aspect, the customer 140 may access a website for summoning an autonomous vehicle. In either case when the customer 140 runs the application or accesses the website, the smartphone 200 may display a list of orders 220, a summon button 230, and a cancel button 240 on the display screen 210. This list is provided for an example purpose only and can include other kinds of orders as readily available to persons having ordinary skill in the art.

The customer 140 may have to identify an order among purchasing, returning, or sending an item. After the order is selected, the customer 140 may decide which button to click. The customer 140 may click the cancel button 240 to cancel what he has selected. In another case when the customer 140 clicks the summon button 230, the smartphone 200 may transmit an indication that the customer has clicked the summon button 230 to the delivery server 110. By clicking the summon button 230 once, the customer 140 may be able to summon an autonomous vehicle.

Further, the smartphone 200 may include a global positioning system (GPS) sensor 250. Based on the GPS sensor 250, the smartphone 200 may estimate a location where the smartphone 200 is positioned. When the smartphone 200 transmits the indication, the smartphone 200 also transmits the estimated location of the smartphone 200. Thus, when the delivery server 110 receives the indication from the smartphone 200 together with the selected order and the location of the smartphone 200 as the location of the customer 140.

In an aspect, when the customer's smart device, which includes a GPS sensor, is not registered in the delivery system, the default location of the customer, such as a home or office address, is set by the customer.

In another aspect, when the customer registers more than one smart device, the customer may select one smart device as a default smart device for identifying the location of the customer.

Upon reception of the indication, the selected order, and the location of the customer 140, the delivery server 110 may communicate with the autonomous vehicles 120 and the parking station 130 to receive location information of the autonomous vehicles 120 and the parking station 130. In an aspect, the delivery server 110 may perform a search for autonomous vehicles 120, which can travel to the customer optimally in the shortest distance or in the shortest time based on locations of the autonomous vehicles in relationship with the location of the customer 140.

As described above, the customer 140 may summon the autonomous vehicle for purchasing items, returning an already purchased item, or sending an item to someone else. In a case when the selected order is to purchase an item, the delivery server 110 may perform a search for an autonomous vehicle, which contains in its compartment the item which the customer want to buy. In another case when the customer 140 receives a defective item or an item which is different from what the customer 140 has purchased, the selected order is to return the item. In this situation, the delivery server 110 may perform a search for an autonomous vehicle, which has a storage space sufficiently large to receive it in consideration of the distance between the customer 140 and the destination of the return.

When the selected order is to send an item to someone else, the delivery server 110 may perform a search for an autonomous vehicle which has a storage space sufficiently large to receive it and has a low priority for potential future orders during the delivery of the item. In short, the delivery server 110 may heuristically perform a search for an autonomous vehicle, which is optimally located, based on the location of the customer 140, based on the weighted distance to the customer 140, or other suitable optimization algorithm. This is not an exhaustive list but provides only examples. Other suitable method may be readily appreciated by person having ordinary skill in the art not departing from the scope of this disclosure.

In various embodiment, the autonomous vehicle may be used as a rental car. In this case, the item for sending is the customer itself. Description of these rental car features can be found in commonly assigned U.S. patent application Ser. No. 16/047,659, filed on Jul. 27, 2018, entire contents of which are incorporated herein by reference.

Based on the delivery location and capability of the autonomous vehicles 120, the delivery server 110 may select an autonomous vehicle 120, which is optimally located and capable of performing the order requested from the customer 140. In an aspect, the delivery server 110 may optimize routes to the location of the customer 140 from the location of the selected autonomous vehicle 120 and instruct the autonomous vehicle 120 to travel to the location of the customer by following the optimized route. In another aspect, the delivery server 110 may transmit to the selected autonomous vehicle the location of the customer 140, and the selected autonomous vehicle may perform a search for an optimum route to the location of the customer 140 and autonomously drives to the location of the customer 140 by following the optimum route.

Configuration of the autonomous vehicles 120 may be for land travel, such as a small fully-autonomous (or semi-autonomous) automobile. The fully-autonomous (or semi-autonomous) automobile may be narrow (e.g., 2-5 feet wide) or wide (e.g., greater than 5 feet wide), low mass and low center of gravity for stability, having multiple secure compartments assignable to one or more customers, retailers and/or vendors, and designed for moderate working speed ranges (i.e., 1.0-45.0 mph) to accommodate inner-city and residential driving speeds. Additionally, in some embodiments, the land autonomous vehicles may be configured with a maximum speed range from 1.0 mph to about 90.0 mph for high speed, intrastate or interstate driving. Each autonomous vehicle in the fleet may be equipped with onboard sensors (e.g., cameras (running at a high frame rate, akin to video), LiDAR, radar, ultrasonic sensors, microphones, etc.) and internal computer processing to constantly determine where it can safely navigate, what other objects are around each autonomous vehicle and what it may do.

In some embodiments, the autonomous vehicles 120 may be semi-autonomous. In some embodiments, it may be necessary to have human interaction between the autonomous vehicles 120, the fleet operator, and the customer 140 to address previously unforeseen issues (e.g., a malfunction with the navigation module; provider inventory issues; unanticipated traffic or road conditions; or direct customer interaction after the robot arrives at the customer location).

In in some embodiments, the autonomous vehicles 120 may be controlled directly by a fleet operator. In some embodiments, it may be necessary to have direct human interaction between the autonomous vehicles 120 and/or the fleet operator to address maintenance issues such as mechanical failure, electrical failure, or a traffic accident. In aspects, the fleet operator may remotely operate the autonomous vehicles 120.

In some embodiments, each autonomous vehicle 120 may be configured with a working speed range from 13.0 mph to 45.0 mph. In some embodiments, the land autonomous vehicles 120 in the fleet may be configured with a maximum speed range from 13.0 mph to about 90.0 mph.

In some embodiments, the autonomous vehicles 120 may be configured for water travel as a watercraft and is configured with a working speed range from 1.0 mph to 45.0 mph.

In some embodiments, the autonomous vehicles 120 may be configured for hover travel as an over-land or over-water hovercraft and is configured with a working speed range from 1.0 mph to 60.0 mph.

In some embodiments, the autonomous vehicles 120 may be configured for air travel as an aerial drone or aerial hovercraft and is configured with a working speed range from 1.0 mph to 80.0 mph.

In some embodiments, the autonomous vehicles 120 may be further configured to be part of a sub-fleet of autonomous vehicles, and each sub-fleet may be configured to operate independently or in tandem with multiple sub-fleets having two or more sub-fleets.

In some embodiments, the autonomous vehicle 120 may be accessed directly by the customer 140 without a physical key, when the autonomous vehicle 120 arrive at the location of the customer 140. Authentication should be passed by the customer 140 to access the autonomous vehicle 120.

In some embodiments, there will likely be times when an autonomous vehicle 120 breaks down, has an internal system or module failure or is in need of maintenance. For example, in the event that the navigation module should fail, each autonomous vehicle 120 within the fleet is configurable to allow for direct control of the autonomous vehicle's processor to override the conveyance and sensor systems (i.e., cameras, etc.) by a fleet operator to allow for the safe return of the vehicle to a base station for repair.

Figure 3:
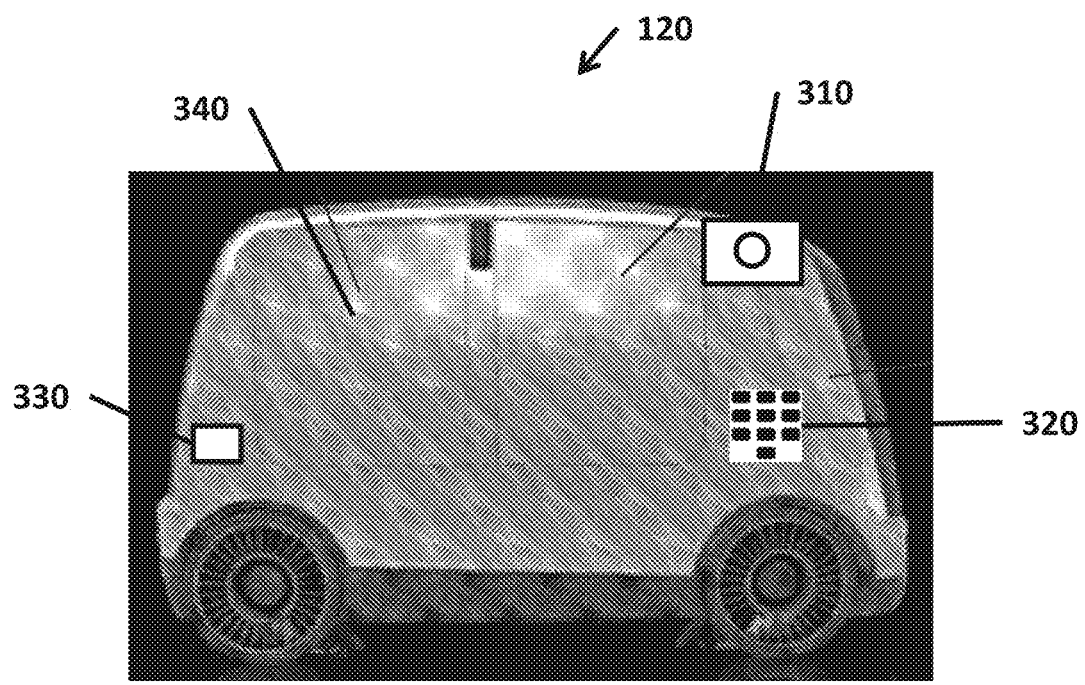
FIG. 3 is an illustration of the autonomous vehicle of FIG. 1 in accordance with embodiments of the present disclosure.

FIG. 3 shows features of an autonomous vehicle to be delivered to customers. For example, the autonomous vehicle 120 may include several authentication means, such as an image capturing device 310, a keypad 320, and the scanner 330. When the autonomous vehicle 120 arrives at the location of the customer 140, the autonomous vehicle 120 grants an access thereto after authenticating the customer 140. For example, the autonomous vehicle 120 takes a picture of the customer 140 using the image capturing device 310 and performs facial recognition. When the customer 140 is verified, the customer 140 can access a compartment 340 of the autonomous vehicle 120. In an aspect, the image capturing device 310 is used for navigation purposes as well.

In embodiments, the customer 140 is given a key code to access the autonomous vehicle 120 via a text message, an email, or an image from the delivery server 110 after transmitting the indication. When the autonomous vehicle 120 arrives at the location of the customer 140, the customer 140 enters the key code via the keypad 320. If the entered key code matches the key code from the delivery server 110, the customer 140 is granted an access to the autonomous vehicle 120.

In embodiments, the customer 140 is authenticated by the scanner 330. The customer 140 put his/her hand on the scanner 330, which scans bio specifics of the hand and verifies the customer 140. For example, the bio specifics may include fingerprint, vein configuration, hand geometry, handwriting, etc. This list is provided only for providing examples and is not meant to be limiting. In aspects, the autonomous vehicle 120 may utilize bio mark recognition such as iris recognition by using the scanner 330. Further, the autonomous vehicle 120 may utilize other authenticating methods readily appreciated by those skilled in the art not departing from the scope of this disclosure.

After verification of the customer 140, the autonomous vehicle 120 grants an access to the customer 140. Based on the requested order, the customer 140 can purchase, return, and send an item by using the compartment 340.

Further details of the autonomous vehicles 120 can be found as a robot vehicle in commonly assigned Provisional Application No. 62/538,538, filed Jul. 28, 2017, of which title is FLEET OF ROBOT VEHICLES FOR SPECIALITY PRODUCT AND SERVICE DELIVERY, of which the first inventor is David Ferguson, and the entire contents of which are incorporated herein by reference.

Figure 4:
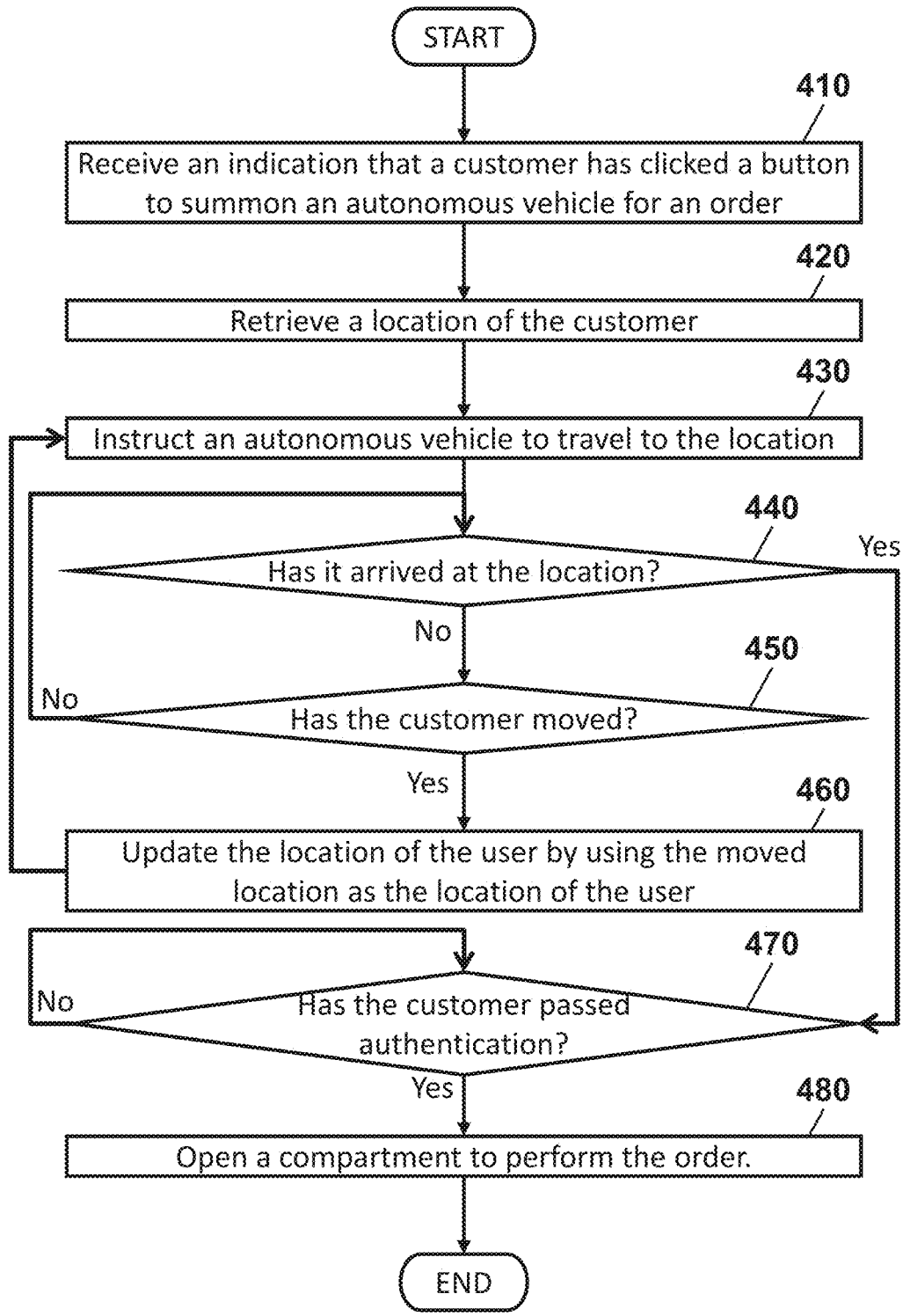
FIG. 4 is a flowchart for the one-click delivery of an autonomous vehicle in accordance with embodiments of the present disclosure.

Now referring to FIG. 4, a flowchart is shown illustrating a method 400 for delivering an autonomous vehicle to location of a customer after receiving one-click indication for summon in accordance with embodiments of the present disclosure. The method 400 starts with receiving an indication that a customer has clicked a summon button to summon an autonomous vehicle in step 410. In aspect, the summon button may be displayed on a smart device or a monitor of the customer. To summon an autonomous vehicle, what the customer has to do is clicking the summon button once and no further action.

In an aspect, the customer may also identify an order among purchasing, returning, or sending an item. In another aspect, the order may be renting an autonomous vehicle. These rental features can be found in commonly assigned U.S. patent application Ser. No. 16/047,659, filed on Jul. 27, 2018, entire contents of which are incorporated herein by reference.

In step 420, the smart device of the customer also sends its location to the delivery server. In an aspect, the location may be simultaneously sent to the delivery server with the indication.

In an aspect, the smart device may send a kind of order among purchasing, returning, and sending an item to the delivery server.

After reception of the indication, the delivery server may select and instruct an autonomous vehicle, appropriate for the order, to travel to the customer in step 430.

In step 440, it is determined whether the autonomous vehicle has arrived at the location identified by the smart device of the customer. The method 400 goes to step 470 when it is determined that the autonomous vehicle has arrived. If not, it is determined whether the customer has moved in step 450.

The movement of the customer can be identified based on a GPS sensor installed in the smart device. When the customer moves, the smart device transmits the updated location of the customer to the delivery server. In an aspect, the delivery server may disregard the customer's movement when the amount of displacement between the location retained in the delivery server and the updated location is less than a predetermined threshold. In other words, the delivery server does not transmit the updated location to the autonomous vehicle unless the displacement is recognizably big for the autonomous vehicle. The predetermined threshold may be about 10 feet.

When the displacement is larger than or equal to the predetermined threshold, it is determined that the customer has moved in step 450. In this case, the location of the customer is updated to be the current location of the customer in step 460. The method 400 then moves back to step 430 and the delivery server instructs the autonomous vehicle to travel to the updated location.

When the displacement is less than the predetermined threshold, it is determined that the customer has not moved in step 450. In this case, the method 400 moves back to step 440. In this way, steps 430-460 make possible that the autonomous vehicle can follow the customer regardless of movements of the customer.

After it is determined that the autonomous vehicle has arrived at the location in step 440, the customer has to pass an authentication process to receive an access to the autonomous vehicle. In step 470, it is determined whether the customer has passed the authentication. In an aspect, step 470 may be repeated until the customer passes the authentication. In another aspect, the customer may receive a certain number of trials for the authentication. For example, if the customer fails the authentication three or five consecutive times, the autonomous vehicle would not grant an access to the customer.

When the customer is determined to pass the authentication in step 470, the autonomous vehicle may grant the customer an access thereto, meaning that the autonomous vehicle opens a compartment so that the customer can purchase, return, or send an item. In this way, with only one-click of a summon button by the customer, the method 400 can instruct an autonomous vehicle to travel to the customer no matter where the customer moves.

Figure 5:
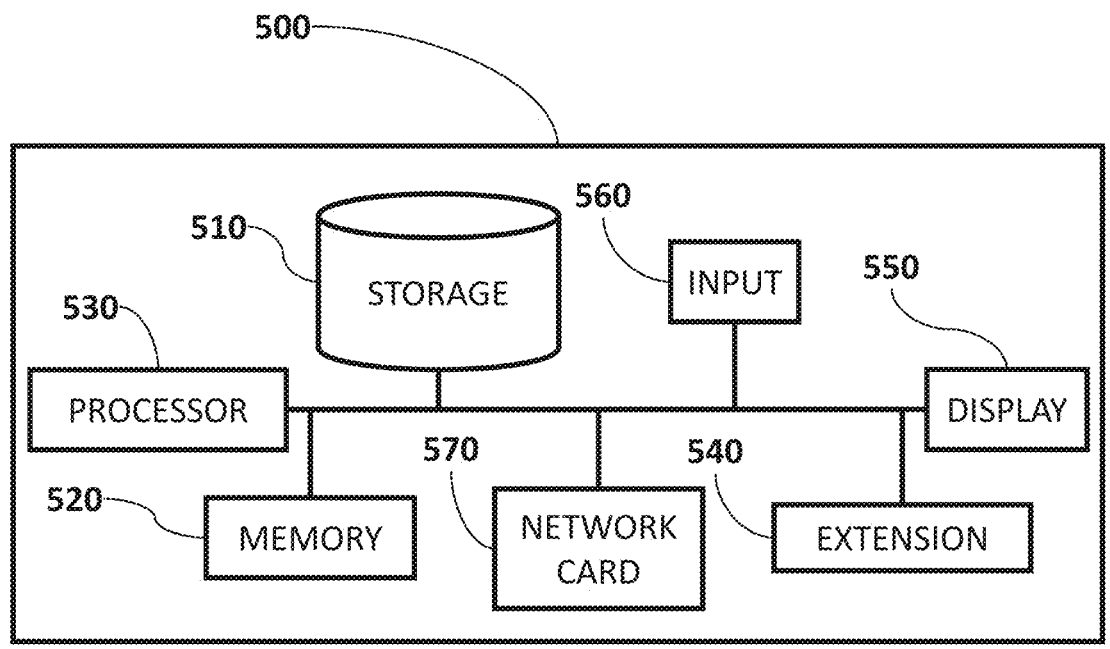
FIG. 5 is a functional block diagram of a delivery system or a smart device in accordance with embodiments of the present disclosure.

FIG. 5 is a block diagram for a computing device 500 representative of the managing server or controller of the robot fleet of FIG. 1, the smart device of FIG. 2, or a controller of the autonomous vehicle of FIG. 3 in accordance with embodiments of the present disclosure. The computing device 500 may include a storage 510, memory 520, processor 530, extension 540, display device 550, input device 560, and network card 570. The storage 510 stores data to be accessed for reading and editing programs to be executed. The memory 520 may include a random access memory (RAM) and a read-only memory (ROM). The ROM generally stores booting programs that run when the computing device is turned on and the RAM is used for fast performance, i.e., loading a program and/or calculating data.

The processor 530 is a brain to the computing device. The processor 530 executes instructions which implement tasks or functions of programs. When a user executes a program, the processor 530 reads the program stored in the storage 510, loads the program on the RAM, and executes instructions prescribed by the program.

A user may input and/or modify data via the input device 560 that may include a keyboard, a mouse, or any other device with which the use may input data. The display device 550 displays data on a screen of the display device 550. The display device 550 may be a touch screen so that the display device 550 can be used as an input device.

The extension 540 may include several ports, such as one or more universal serial buses (USBs), IEEE 1394 ports, parallel ports, and/or expansion slots such as peripheral component interconnect (PCI) and PCI express (PCIe). The extension 540 is not limited to the list but may include other slots or ports that can be used for appropriate purposes. The extension 540 may be used to install hardware or add additional functionalities to a computer that may facilitate the purposes of the computer. For example, a USB port can be used for adding a storage to the computer and/or an IEEE 1394 may be used for receiving moving/still image data.

The network card 570 is used to communicate with the robot vehicles, rental vehicles, or mobile devices, wirelessly or via a wired connection. Through the network card 570, the robot vehicles, rental vehicles, or mobile devices may receive, modify, and/or update from and to the managing server.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. An autonomous vehicle comprising:
   a compartment;
   at least one processor; and
   a memory storing instructions which, when executed by the at least one processor, cause the autonomous vehicle to:
   in response to a one-click request from an entity to summon the autonomous vehicle to transport an item to a destination location, travel to a pickup location of the entity based on global position system (GPS) coordinates of a user device of the entity, wherein the pickup location is adjustable based on a movement of the user device such that new GPS coordinates of the user device of the entity are not provided to the autonomous vehicle based on a displacement amount between the GPS coordinates and the new GPS coordinates being less than a predetermined threshold and the new GPS coordinates are provided to the autonomous vehicle when the displacement amount is equal to or greater than the predetermined threshold, wherein, when a plurality of user devices are associated with the entity, selecting a default user device as the user device for identifying the pickup location, and wherein the autonomous vehicle is selected from a plurality of autonomous vehicles based on the autonomous vehicle having a low priority for future orders while the autonomous vehicle is transporting the item to the destination location and based on a weighted distance from a current location of the autonomous vehicle to the pickup location;

determine that the entity has passed authentication within a number of trials;

in response to determining that the entity has passed the authentication within the number of trials, grant the entity access to the compartment;

store the item in the compartment; and transport the item to the destination location.

2. The autonomous vehicle of claim 1, wherein the instructions, when executed by the at least one processor, cause the autonomous vehicle to:

travel to the pickup location of the entity based on the compartment having sufficient storage space for the item.

3. The autonomous vehicle of claim 1, wherein the instructions, when executed by the at least one processor, cause the autonomous vehicle to:

travel to the pickup location of the entity from a parking station at which a fleet of autonomous vehicles is stationed, wherein the fleet of autonomous vehicles includes the autonomous vehicle.

4. The autonomous vehicle of claim 1, wherein the instructions, when executed by the at least one processor, cause the autonomous vehicle to:

travel to the pickup location of the entity further based on a time for the autonomous vehicle to travel to the pickup location of the entity.

5. The autonomous vehicle of claim 1, further comprising an image capturing device, wherein the instructions that cause the autonomous vehicle to determine that the entity has passed the authentication within the number of trials include instructions that cause the autonomous vehicle to:

take a picture of the entity using the image capturing device;

perform facial recognition on the picture; and based on the facial recognition, verify the entity within the number of trials.

6. The autonomous vehicle of claim 1, further comprising a keypad, wherein the instructions that cause the autonomous vehicle to determine that the entity has passed the authentication within the number of trials include instructions that cause the autonomous vehicle to:

obtain, by the processor of the autonomous vehicle, a first key code from a server;

obtain a second key code via the keypad, wherein the second key code is provided to the user device; and determine that the second key code obtained via the keypad matches the first key code obtained from the server within the number of trials.

7. A method comprising:

in response to a one-click request from an entity to summon an autonomous vehicle to transport an item to a destination location, the autonomous vehicle including a compartment, at least one processor; and a memory storing instructions which, when executed by the at least one processor, cause the autonomous vehicle to perform:

traveling to a pickup location of the entity based on global position system (GPS) coordinates of a user device of the entity, wherein the pickup location is adjustable based on a movement of the user device such that new GPS coordinates of the user device of the entity are not provided to the autonomous vehicle based on a displacement amount between the GPS coordinates and the new GPS coordinates being less than a predetermined threshold and the new GPS coordinates are provided to the autonomous vehicle when the displacement amount is equal to or greater than the predetermined threshold, wherein, when a plurality of user devices are associated with the entity, selecting a default user device as the user device for identifying the pickup location and wherein the autonomous vehicle is selected from a plurality of autonomous vehicles based on the autonomous vehicle having a low priority for future orders while the autonomous vehicle is transporting the item to the destination location and based on a weighted distance from a current location of the autonomous vehicle to the pickup location;

determining that the entity has passed authentication within a number of trials;

in response to determining that the entity has passed the authentication within the number of trials, granting the entity access to the compartment;

storing the item in the compartment; and transporting the item to the destination location.

8. The method of claim 7, further comprising:

traveling to the pickup location of the entity based on the compartment having sufficient storage space for the item.

9. The method of claim 7, wherein the processor of the autonomous vehicle further cause the autonomous vehicle to perform:

traveling to the pickup location of the entity from a parking station at which a fleet of autonomous vehicles is stationed, wherein the fleet of autonomous vehicles includes the autonomous vehicle.

10. The method of claim 7, wherein the processor of the autonomous vehicle further causes the autonomous vehicle to perform:

traveling to the pickup location of the entity further based on a time for the autonomous vehicle to travel to the pickup location of the entity.

11. The method of claim 7, wherein determining that the entity has passed the authentication within the number of trials includes:

taking a picture of the entity using an image capturing device;

performing facial recognition on the picture; and based on the facial recognition, verifying the entity within the number of trials.

12. The method of claim 7, wherein determining that the entity has passed the authentication within the number of trials includes:

obtaining a first key code from a server;

obtaining a second key code via a keypad; and determining that the second key code obtained via the keypad matches the first key code obtained from the server within the number of trials.

13. The method of claim 7, further comprising:

controlling the autonomous vehicle to follow the user device of the entity regardless of movements of the entity.

\* \* \* \* \*